Patented Mar. 7, 1950

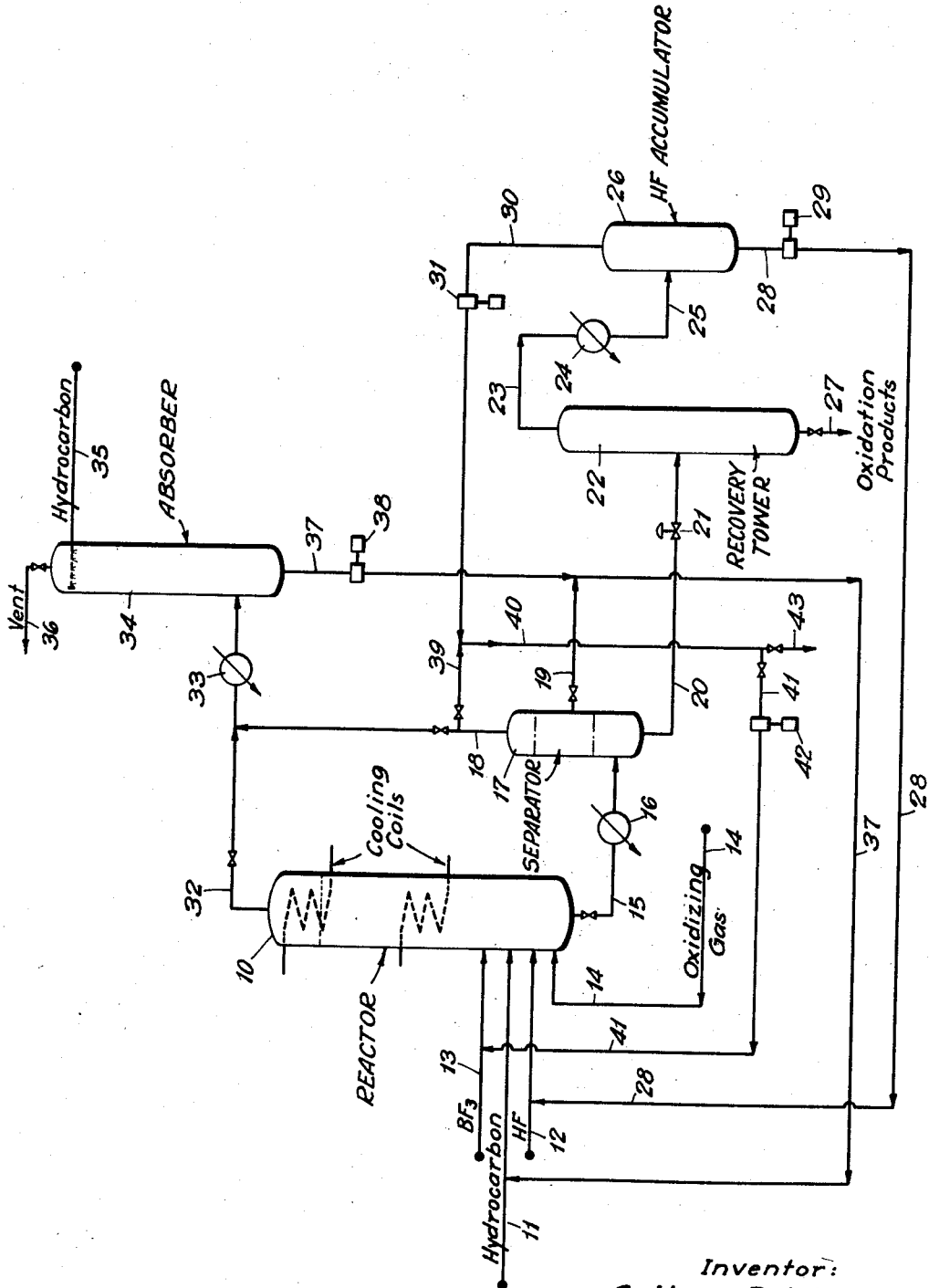

2,499,515

UNITED STATES PATENT OFFICE 2,499,515

OXIDATION OF AROMATIC HYDROCARBONS

Arthur P. Lien, Hammond, Ind., assignor to Standard Oil Company, Chicago, Ill., a corporation of Indiana Application June 29, 1949, Serial No. 102,081

15 Claims. (Cl. 260—621)

This invention relates to a catalytic process for the oxidation of hydrocarbons. More specifically it relates to a process for oxidizing hydrocarbons in the liquid phase with HF—$BF_3$ catalysts.

An object of my invention is to provide novel catalysts comprising HF and $BF_3$ for the oxidation of hydrocarbons, particularly aromatic hydrocarbons, e. g., benzene or the xylenes. Another object of my invention is to provide a novel oxidation process wherein a liquid catalyst comprising HF and $BF_3$ is employed and wherein the oxidation products form addition complexes with the catalyst, which complexes can be treated to liberate the catalyst and oxidation products. A further object is to provide a novel hydrocarbon oxidation process wherein secondary oxidation of the primary oxidation products is inhibited by the conversion of the primary oxidation products to an oxidation-resistant addition complex with the liquid HF—$BF_3$ catalyst which is employed in the oxidation process.

Still another object of my invention is to provide a novel process for the production of phenol by the oxidation of benzene with a gas stream containing molecular oxygen in the presence of a liquid catalyst comprising HF and $BF_3$. A further object of my invention is to provide a process for the oxidation of aromatic hydrocarbons capable of forming complexes with $BF_3$ in liquid hydrogen fluoride solution as homogeneous solutions containing HF, $BF_3$ and said aromatic hydrocarbons to produce derivatives of said aromatic hydrocarbons oxidized in a nuclear position.

I have found that HF and $BF_3$ in combination constitute a catalyst for the oxidation of hydrocarbons, particularly aromatic hydrocarbons such as benzene and xylenes. The HF—$BF_3$ catalysts of this invention make possible the controlled oxidation of aromatic hydrocarbons to yield well defined oxidation products, particularly phenols. It is well-known that phenols are more readily oxidizable than the parent hydrocarbons from which they are derived, so that it has hitherto been well-nigh impossible to oxidize aromatic hydrocarbons directly to phenols. However, the HF—$BF_3$ catalysts of this invention react with phenols and other oxygenated compounds to form more or less stable addition complexes which are resistant to oxidation under the conditions which are suitable for oxidizing the parent hydrocarbon charging stock.

Benzene and toluene do not form complexes with $BF_3$ in the presence of liquid hydrogen fluoride and are, therefore, subjected to oxidation in the present process as heterogeneous mixtures with hydrogen fluoride and $BF_3$. Certain higher molecular weight aromatic hydrocarbons form more or less stable complexes with $BF_3$ in the presence of liquid hydrogen fluoride, e. g., the xylenes, trimethylbenzenes (especially mesitylene), 2-methylnaphthalene, durene and the like. Ethylbenzene disproportionates readily and substantially quantitatively at temperatures of about 0° C. or above in the presence of liquid hydrogen fluoride and $BF_3$. The latter is required in an amount at least semi-molar with respect to ethylbenzene, to form benzene, which is substantially insoluble in HF—$BF_3$, and m-diethylbenzene, which forms a relatively stable complex with $BF_3$ in the presence of liquid hydrogen fluoride. The $BF_3$-aromatic hydrocarbon complexes contain equimolar amounts of $BF_3$ and aromatic hydrocarbon and are dissolved in or complexed with the liquid hydrogen fluoride, which in my process is normally present in substantial excess of the (presumably) equimolar amount that might be required in forming $BF_3$-aromatic hydrocarbon-HF complexes.

When possible, I prefer to oxidize the aromatic hydrocarbon charging stock as a homogeneous solution in liquid hydrogen fluoride and $BF_3$, since, in certain instances, it appears that the solution ($BF_3$-aromatic hydrocarbon-HF complex) is somewhat more reactive than heterogeneous mixtures of aromatic hydrocarbon, $BF_3$ and hydrogen fluoride and considerably higher yields of the desired oxidation product can be obtained by treatment of the homogenous solution. Furthermore, no liquid-liquid contacting problems arise when a homogeneous solution of the feed stock in the catalyst is employed and the only contacting problem is concerned with oxidizing gas-liquid mixing.

Oxidation of the hydrocarbon charging stock may be effected with oxygen, air, oxygen-enriched air, ozone and the like. I have observed that $SO_2$ is reduced to elemental sulfur upon contact with hydrocarbons, HF and $BF_3$ at moderate temperatures, indicating that $SO_2$ can operate as an oxidizing agent under these conditions. I may, therefore, include $SO_2$ in the oxidizing gas stream.

The amount of oxidizing gas will vary with the extent of reaction desired and the heat-dissipating facilities which are provided in the reaction zone. I can, for example, employ between about 50 and about 1000 standard cubic feet of air per gallon of the hydrocarbon charging stock, for example benzene. In terms of oxygen pressure, the partial pressure of oxygen in the reaction zone may be between about 100 and about 1000 p. s. i. g., preferably about 300 to about 800 p. s. i. g.

The oxidation reaction temperature may vary from about 40° F. to about 400° F., depending upon the particular feed stock and other reaction conditions, but usually I employ temperatures between about 150° F. and 400° F., preferably about 200° F. to 300° F.

The concentration of HF in the reaction zone may vary from 2 to 80 vol. per cent, preferably 10–60 vol. per cent, based on total liquid reactor content. On a molar basis, I may employ between about 5 and about 50 moles, preferably about 20 to about 40 moles, of liquid hydrogen fluoride per mole of the hydrocarbon charging stock. Substantial molar excesses of liquid hydrogen fluoride, as pointed out above, are especially desirable in oxidation operations conducted with aromatic hydrocarbon charging stocks capable of forming complexes with $BF_3$ in the presence of liquid hydrogen fluoride, in which case hydrogen fluoride acts as a fluid reaction medium and solvent for the $BF_3$-aromatic hydrocarbon complex.

It is desirable to maintain an excess of $BF_3$, e. g. sufficient to exert 5–300 p. s. i. g. partial pressure, preferably 20–100 p. s. i. g. throughout the run in order to combine with the organic oxygen compounds as formed. When the aromatic hydrocarbon charging stock is capable of forming a $BF_3$ complex in the liquid hydrogen fluoride phase, I prefer to employ equimolar quantities of $BF_3$ and the aromatic hydrocarbon, sufficient $BF_3$ pressure being maintained on the system to establish this condition. The oxidation of $BF_3$-aromatic hydrocarbon complexes results in the production of $BF_3$-phenolic complexes which stabilize the phenolic product against undesirable secondary oxidation reactions.

The degree of the oxidation reaction is affected by the temperature, length of holding time, and partial pressure of oxygen on the system. Suitable holding times fall between about 1 minute and about 10 hours, depending upon the other reaction conditions. Under the preferred temperature conditions, holding times between about 10 minutes and about 1 hour are preferred. The total pressure in the reaction system may range from about 100 to about 2500 p. s. i. g., preferably about 350 to about 1000 p. s. i. g.

The oxidation process of my invention will now be described with reference to the accompanying flow diagram. A hydrocarbon, for example an aromatic hydrocarbon such as benzene, toluene, or a xylene is passed into an oxidation reactor 10 through line 11. Liquid hydrogen fluoride in suitable amounts, as indicated supra, is introduced into the reactor through line 12, $BF_3$ is introduced through line 13 and an oxidizing gas stream, for example oxygen, air, oxygen-enriched air or the like is introduced into the reactor through line 14. When the aromatic hydrocarbon charging stock is capable of forming a complex with $BF_3$ in the presence of liquid hydrogen fluoride, said complex may be formed in a separate zone, e. g., in a packed tower wherein the aromatic hydrocarbon and liquid hydrogen fluoride are passed downwardly against an upflow of $BF_3$ gas, or the complex may be formed in reactor 10. If desired, a $BF_3$-aromatic hydrocarbon complex in liquid hydrogen fluoride may be introduced at a high point in reactor 10 to flow downwardly countercurrent to oxidizing gas introduced at a low point in said reactor.

The reactor may be equipped with a copper lining or packing. Copper or its oxides or salts may function as co-catalysts with HF and $BF_3$; alternatively, I may use salts or oxides of lead, manganese, cobalt, vanadium or chromium as co-catalysts with HF and $BF_3$. The reactants and catalyst are thoroughly agitated in the reactor by conventional means such as mechanical agitators, recirculating pumps or by passage of the reactants and catalyst through packing materials. Cooling coils or jackets may be provided in the reactor to aid in controlling the reaction temperature.

Instead of employing a reaction tower, I may employ a mixing-settling system similar to that employed in isoparaffin-olefin alkylation processes conducted in the presence of liquid acid catalysts such as hydrogen fluoride and sulfuric acid.

After the desired holding time in the reactor, a liquid stream is withdrawn from the bottom of the reactor through valved line 15 and is passed through heat exchanger 16 into separating vessel 17. The operation and function of vessel 17 depend upon the form of reaction mixture, i. e., whether it is a homogeneous solution obtained upon oxidizing a $BF_3$-aromatic hydrocarbon complex dissolved in excess liquid hydrogen fluoride or whether it is a heterogeneous mixture obtained upon oxidizing benzene or other aromatic hydrocarbon which does not form a $BF_3$-hydrocarbon complex.

Where a heterogeneous liquid mixture is being oxidized, vessel 17 functions as a settler and gas separation drum. In this mode of operation, a gas stream comprising $BF_3$, gaseous oxygen and, where air is used in the oxidation, nitrogen is withdrawn from vessel 17 through line 18. A supernatant liquid layer of unreacted hydrocarbon forms in vessel 17 and may be withdrawn through valved line 19 for recycle to the reactor. Since the unreacted hydrocarbon layer contains some of the hydrocarbon oxidation products, it may be desirable to treat this layer by conventional methods to effect their removal. A lower layer comprising HF, $BF_3$ and complexes of HF and $BF_3$ with the major portion of the oxidation product or products is withdrawn from separator 17 through line 20, and is then passed through a pressure reducing valve 21 into recovery tower 22. In tower 22, the HF and $BF_3$ complexes with the oxidation products are subjected to a temperature between about 200 and about 500° F. and a pressure beteen about 5 and about 100 p. s. i. absolute to decompose the complexes into their components. An overhead gas stream passes from tower 22 through line 23 and partial condenser 24 wherein the HF in the vapor stream is liquefied. The mixture of liquid and vapors then passes through line 25 into accumulator drum 26. Oxygenated products produced by the process of the present invention are removed from recovery tower 22 through valved line 27 and may be purified by methods known in the art. The principal product produced by the oxidation of benzene is phenol. Toluene may be oxidized to cresols. The oxidation of xylenes produces xylenols and of mesitylene, 2,4,6-trimethylphenol.

Liquid HF is removed from accumulator 26 through line 28 and is forced by pump 29 to line 12 for recycle to reactor 10. A $BF_3$-containing gas stream, which contains substantially no oxygen, leaves accumulator 26 through line 30, whence it is forced by pump 31 into lines 40 and 41 for recycle to reactor 10.

A gas stream comprising HF, BF₃, oxygen and, where air is used in the oxidation, nitrogen, as well as some of the hydrocarbon charge, passes overhead from reactor 10 through valved line 32 into cooler 33 and thence to an absorber 34. Cold fresh hydrocarbon charge may be passed downwardly through absorber 34 to absorb the hydrocarbon and catalyst components of the gas stream passing through the tower. The absorbent liquid may be introduced into the absorber 34 through line 35. Unabsorbed gases are vented through valved line 36. The enriched absorption medium passes from tower 34 through line 37 and is then forced by pump 38 into line 11 and thence to reactor 10. The gas stream in line 32 may be joined by a BF₃-containing gas stream vented from separating vessel 17 through valved line 18. When substantially undiluted oxygen is charged to the reactor, the gas stream passing overhead from reactor 10 may be recycled to the lower portion of the reactor (by lines not shown). Alternatively, part or all of the BF₃-containing gas stream vented from separating vessel 17 may be passed into valved line 39 where it is joined by a BF₃-containing gas stream vented from HF accumulator 26, and thence through line 40, line 41 and pump 42 into line 13 for recycle to reactor 10. Part of the BF₃-containing gas stream passing into line 40 may be removed from the system through valved line 43.

Although absorption of HF and BF₃ in hydrocarbon charging stock has been described, it will be apparent that other absorbents or adsorbents may be used. Thus the catalyst components can be absorbed upon solid absorbents, e. g. sodium fluoride, calcium fluoride or other known absorbents.

When a solution of a BF₃-aromatic hydrocarbon, e. g., BF₃-xylenes, in liquid hydrogen fluoride is employed as the feed stock, the reaction mixture is passed from reactor 10 to vessel 17 which, in this case, takes the form and function of a distillation tower. The top temperature in this tower is maintained between about 80 and about 150° F., and the bottom temperature between about 150 and about 250° F. A gas stream comprising loosely-bound or free BF₃ and HF, as well as unreacted oxygen and/or nitrogen, the latter being present when air is employed as the oxidant, passes overhead through line 18 for treatment as above described. A side-stream comprising unconverted aromatic hydrocarbon liberated from its complex with HF and BF₃ may be trapped out in tower 17 and recycled through line 19 to reactor 10. The bottoms from tower 17, comprising essentially BF₃ complexes with phenols and unconverted aromatic hydrocarbons, are passed through line 20 to tower 22 for treatment as above described. In this case, however, the oxidation products are more or less contaminated with unconverted hydrocarbons and it may therefore be desirable to subject the products in line 27 to a fractionation operation in a tower (not shown) to segregate the phenolic oxidation products and an aromatic hydrocarbon fraction which may be recycled to reactor 10.

The following examples are intended to illustrate but not unduly to limit the process of my invention.

Example 1

Benzene (613 g.; 700 cc.) was added at room temperature to a carbon steel bomb fitted with a 1725 R. P. M. mechanical stirrer and a bleed-off tube positioned to allow ready removal of a supernatant unconverted benzene layer from a lower liquid layer comprising HF—BF₃ and addition complexes thereof with phenol. Liquid hydrogen fluoride in the amount of 391 grams was then added to the reaction bomb, following which 22 grams of BF₃ was added. Then sufficient oxygen was added to bring the total initial pressure in the reactor to 300 p. s. i. g. at 212° F. All the ingredients were added at room temperature, following which the contents of the reactor were heated to 212° F., at which temperature they were maintained for 3 hours with stirring. A pressure drop of 75 p. s. i. g. was observed at 212° F. over the 3 hour period. At the end of 3 hours the reactor was cooled to room temperature without releasing pressure and 22 grams more of BF₃ were forced into the reactor. Additional oxygen was forced into the reactor, which was then reheated to 212° F., at which time the initial pressure was 405 p. s. i. g. Contacting was continued 1¼ hours at 212° F. during which time the pressure drop was 70 p. s. i. g. After the reactor was cooled, 438 grams of supernatant layer, comprising principally unconverted benzene, was withdrawn through the overhead bleed-out tube. The lower liquid layer (572 g.) in the reactor, comprising HF, BF₃ and addition complexes of HF and BF₃ with phenol, was withdrawn through a valve in the bottom of the reactor. Residual BF₃ in the reactor was withdrawn through the bleed-out tube and absorbed in soda lime. Residual oxygen was vented through a gas meter. The material balance obtained in the reaction was 97 weight percent. The supernatant hydrocarbon layer from the reactor was washed with aqueous caustic soda and the caustic washings were acidified and extracted with ethyl ether to remove phenol. The lower catalyst layer containing addition complexes was heated to about 190° F. at about atmospheric pressure, resulting in the production of vapors which were condensed and washed with aqueous caustic soda, following which the alkaline extract was acidified and extracted with ether to recover phenol. The solid residue resulting from the catalyst-addition complex decomposition step amounted to 36 grams and was, like the other fractions, washed with aqueous caustic, following which the caustic extract was extracted with ether to recover phenol. The following phenol distribution was obtained; 0.9 gram from the unconverted benzene layer; 1.8 grams from the vapors derived from the catalyst-addition complex decomposition step; 0.6 gram from the solid residue obtained in the catalyst-addition complex decomposition step. Unavoidable phenol losses were entailed by the various treatments.

Example 2

In a 1500 ml. steel pressure reactor, fitted with a high speed stirrer, were placed 40.5 grams (0.38 mole) of m-xylene and 184 grams (9.2 moles) of HF. There were then injected into the bomb 29 grams (0.43 mole) of BF₃, providing a slight excess of BF₃ pressure. Oxygen was then passed into the reactor at 40° F. until the pressure was 170 lbs./sq. in., then the reaction mixture was heated to 210° F., the pressure consequently increasing to 340 lbs./sq. in. The mixture was stirred for 140 minutes, by which time the pressure had decreased to 310 lbs./sq. in. The contents of the bomb were then cooled, withdrawn and poured onto a large volume of ice, which served to further cool the reaction mixture and to hydrolize complexes of BF₃ with unconverted aromatic hydrocarbons and the m-xylene oxidation product. The resultant mixture was then extracted with benzene. The benzene extract was neutralized with ammonium hydroxide and then extracted with a 20% solution of potassium hydroxide. After the caustic extract was washed with ether (to remove any neutral oil entrained in the extract) it was acidified and again extracted with ether. After removal of the ether, the alkali-soluble product weighed 2.4 grams and had a strong phenolic odor. The yield, calculated as xylenol, was 5.2%.

Although my invention has been described specifically with reference to the oxidation of benzene and my-xylene, it will be apparent that it is not thus limited and that it may be applied to the oxidation of numerous other hydrocarbons. Other hydrocarbon charging stocks, which form more or less stable complexes with $BF_3$ or disproportionate to form aromatic hydrocarbons which form stable complexes with $BF_3$ in the presence of liquid hydrogen fluoride, may comprise aromatics such as ethylbenzene, xylenes, isoproplybenzene, tert-butylbenzene, di-tert-butylbenzenes, methylnaphthalenes, cymenes, ethylxylenes, ethyltoluenes, cyclohexyltoluenes, cyclohexylxylenes, mesitylene, durene, isodurene, prehnitene, pseudocumene, hemimellitene, t-butyltoluene, naphthalene, dimethylnaphthalenes, butylnaphthalenes, amylnaphthalenes, ethyldiphenyls, indene, fluorene, and the like. It is not necessary to employ pure aromatic hydrocarbon charging stocks for the purpose of the present process and it is thus possible to employ as feed stocks aromatic hydrocarbon fractions derived from thermal or catalytic reforming, hydroforming, hydrogenation, thermal or catalytic cracking operations and the like. The present process is generally applicable to relatively low boiling aromatic hydrocarbons, i. e. aromatic hydrocarbons boiling below about 600° F. Also my process may be applied to the oxidation of other classes of hydrocarbons than aromatic hydrocarbons, e. g. paraffins, cycloparaffins, olefins, etc. My invention may be applied to the oxidation of hydrocarbon mixtures such as gasolines, naphthas, kerosenes and the like.

The present application is a continuation-in-part of my previous application for Letters Patent, Serial No. 714,627, filed December 6, 1946, now abandoned.

Having thus described my invention, I claim:

1. A process for the oxidation of a low boiling aromatic hydrocarbon which comprises passing an oxygen-containing gas into a liquid mixture comprising a low boiling aromatic hydrocarbon, HF and $BF_3$, the concentration of HF in said mixture being between about 10 and about 60 per cent by volume and the concentration of $BF_3$ in said mixture being sufficient to exert a partial pressure between about 5 and about 300 p.s.i.g., subjecting said liquid mixture and said oxygen-containing gas to a temperature between about 40 and about 400° F. and a total pressure between about 100 and about 2500 p.s.i.g. for a period of time sufficient to effect partial oxidation of the hydrocarbon charging stock and the formation of a complex which is resistant to oxidation and decomposing said complex to liberate hydrocarbon oxidation product therefrom.

2. The process of claim 1 wherein the hydrocarbon is benzene and the principal oxidation product is phenol.

3. The process of claim 1 wherein the hydrocarbon is a xylene and the principal oxidation product is a xylenol.

4. A process for the oxidation of a low boiling aromatic hydrocarbon which comprises contacting said hydrocarbon in the liquid phase with an oxidizing gas in the presence of a liquid HF—$BF_3$ catalyst under such oxidation reaction conditions that addition complexes of HF, $BF_3$ and hydrocarbon oxidation products are formed in the reaction mixture, thereafter separating catalyst comprising said addition complexes from unconverted hydrocarbon charging stock, subjecting said catalyst containing addition complexes to a temperature and pressure sufficient to decompose said addition complexes thereby liberating HF—$BF_3$ catalyst and hydrocarbon oxidation products, respectively, and separately recovering liberated catalyst and hydrocarbon oxidation products.

5. The process of claim 4 wherein liberated catalyst and unconverted hydrocarbons which are separated from the oxidation reaction mixture are recycled to the oxidation reactor.

6. The process of claim 4 wherein the hydrocarbon charging stock is benzene.

7. The process of claim 4 wherein the hydrocarbon charging stock is a xylene and the principal oxidation product is a xylenol.

8. A process for the oxidation of a low boiling aromatic hydrocarbon which comprises contacting said hydrocarbon in the liquid phase with an oxidizing gas in the presence of a liquid HF—$BF_3$ catalyst under such oxidation reaction conditions that addition complexes of HF, $BF_3$ and hydrocarbon oxidation products are formed in the reaction mixture, withdrawing at least a portion of the oxidation reaction mixture from the oxidation reactor, separating catalyst comprising said addition complexes from unconverted hydrocarbon charging stock, separating hydrocarbon oxidation products contained in said unconverted hydrocarbon charging stock, subjecting said catalyst containing addition complexes to a temperature and pressure sufficient to decompose said addition complexes thereby liberating HF—$BF_3$ catalyst and hydrocarbon oxidation products, respectively, and separately recovering liberated catalyst and hydrocarbon oxidation products.

9. A process for the oxidation of a low boiling aromatic hydrocarbon which comprises contacting said hydrocarbon with air and a liquid catalyst consisting essentially of effective amounts of both HF and $BF_3$ under such oxidation reaction conditions that addition complexes of HF, $BF_3$ and hydrocarbon oxidation products are formed in the reaction mixture, thereafter separating catalyst comprising said addition complexes from unconverted hydrocarbon charging stock, withdrawing a gas stream comprising $BF_3$, oxygen and nitrogen from the oxidation reactor, separating $BF_3$ from said gas stream and recycling $BF_3$ thus recovered to the oxidation reactor, subjecting said catalyst containing addition complexes to a temperature and pressure sufficient to decompose said addition complexes thereby liberating hydrocarbon oxidation products and a gas stream comprising $BF_3$ and recycling the last-named stream directly to said oxidation reactor.

10. A process for the oxidation of a low boiling aromatic hydrocarbon which comprises passing an oxygen-containing gas into a liquid mixture comprising said low boiling aromatic hydrocarbon, HF and $BF_3$, the HF : aromatic hydrocarbon mole ratio in said mixture being between about 5 and about 50 and the concentration of $BF_3$ in said mixture being sufficient to exert a partial pressure between about 5 and about 300 p. s. i. g., subjecting said liquid mixture and said oxygen-containing gas to a temperature between about 40° F. and about 400° F. and a partial pressure of oxygen between about 100 and about 1000 p. s. i. g. for a period of time sufficient to effect partial oxidation of the hydrocarbon charging stock and the formation of a complex which is resistant to oxidation, and decomposing said complex to liberate hydrocarbon oxidation product therefrom.

11. The process of claim 10 wherein the low boiling aromatic hydrocarbon is a xylene.

12. A process for the oxidation of a low boiling aromatic hydrocarbon capable of forming a complex with $BF_3$ in liquid hydrogen fluoride, which process comprises forming a homogeneous solution of said aromatic hydrocarbon, $BF_3$ and liquid hydrogen fluoride, said solution comprising said aromatic hydrocarbon and $BF_3$ in substantially equimolar amounts and liquid hydrogen fluoride in an amount sufficient to produce an HF : aromatic hydrocarbon mole ratio between about 5 and about 50, contacting said solution with an oxidizing gas under such oxidation reaction conditions that addition complexes of HF, $BF_3$ and hydrocarbon oxidation products are formed in the reaction mixture, thereafter separating catalyst comprising said addition complexes from unconverted hydrocarbon charging stock, subjecting said catalyst containing addition complexes to a temperature and pressure sufficient to decompose said addition complexes thereby liberating $HF$—$BF_3$ catalyst and hydrocarbon oxidation products, respectively, and separately recovering liberated catalyst and hydrocarbon oxidation products.

13. The process of claim 12 wherein the low boiling aromatic hydrocarbon is a xylene.

14. A process for the oxidation of a low boiling aromatic hydrocarbon capable of forming a complex with $BF_3$ in liquid hydrogen fluoride, which process comprises forming a homogeneous solution of said aromatic hydrocarbon, $BF_3$ and liquid hydrogen fluoride, said solution comprising said aromatic hydrocarbon and $BF_3$ in substantially equimolar amounts and liquid hydrogen fluoride in an amount sufficient to produce an HF : aromatic hydrocarbon mole ratio between about 5 and about 50, contacting said solution with said oxidizing gas at a temperature between about 150° F. and about 400° F. under a partial pressure of oxygen between about 300 and about 800 p. s. i. g. for a period of time sufficient to effect partial oxidation of said low boiling aromatic hydrocarbon and the formation of a complex which is resistant to oxidation, and decomposing the last-named complex to liberate hydrocarbon oxidation product therefrom.

15. The process of claim 14 wherein the hydrocarbon charging stock is a xylene.

ARTHUR P. LIEN.

No references cited.